H. C. STOUFFER.
Improvement in Lock Nuts.
No. 122,676. Patented Jan. 9, 1872.
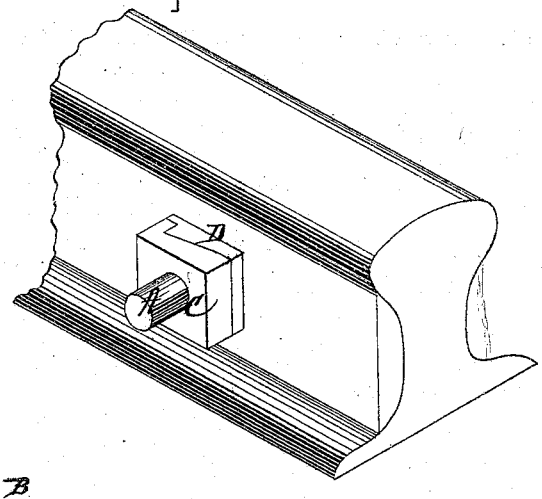
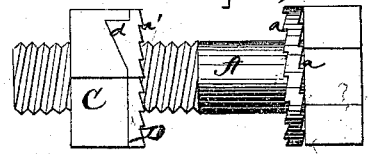
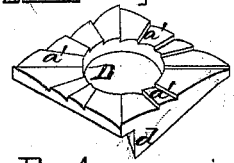
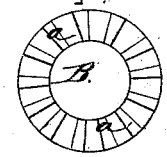
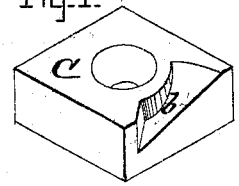
Witnesses:
Henry N. Miller
C. L. Ebert
Inventor
Hiram C. Stouffer
per Alexander Mason
Attorneys.

UNITED STATES PATENT OFFICE.

HIRAM C. STOUFFER, OF COLUMBIANA, OHIO, ASSIGNOR TO HIMSELF, ARTHUR C. YENGLING, AND JACOB DEEMER, OF SAME PLACE.

IMPROVEMENT IN LOCK-NUTS.

Specification forming part of Letters Patent No. 122,676, dated January 9, 1872.

*To all whom it may concern:*

Be it known that I, HIRAM C. STOUFFER, of Columbiana, in the county of Columbiana and in the State of Ohio, have invented certain new and useful Improvements in Nut-Lock; and do hereby declare that the following is a full, clear, and exact description thereof, reference being had to the accompanying drawing and to the letters of reference marked thereon making a part of this specification.

The nature of my invention consists in the construction and arrangement of a "nut-lock," as will be hereinafter more fully set forth.

In order to enable others skilled in the art to which my invention appertains to make and use the same, I will now proceed to describe its construction and operation, referring to the annexed drawing, in which—

Figure 1 is a perspective view, showing the end of a railroad-rail with fish-plate and my nut-lock. Fig. 2 is a side view of the entire nut-lock. Figs. 3 and 5 represent the washers used, and Fig. 4 is a perspective view of the nut.

A represents an ordinary screw-bolt, upon which, next to the head, is placed a steel washer, B. Both sides of this washer are provided with teeth $a\,a$, which radiate from the center, as shown in Fig. 5, and are so arranged that they will prevent the bolt from coming loose. By turning the bolt so as to tighten it, the teeth on the washer will readily allow it to be turned; but if the tendency of the bolt should be to unscrew, then the teeth enter the head of the bolt, as well as the wood or iron against which the washer rests, and prevent the turning of the bolt in that direction. C represents the nut, made in the ordinary manner, but provided on its inner side with a notch, $b$, one side of which is inclined and the other perpendicular with the face of the nut, as shown in Fig. 4. This nut is used in combination with a washer, D, of the same shape as the nut, and provided, on the side toward the nut, with a projection or tooth, $d$, fitting exactly in the notch $b$. The other or inner side of the washer D is provided with radial teeth $a'$, the same as described for the washer B.

When the nut C is being tightened the washer D turns with it, and the teeth $a'$ become pressed into the wood or iron against which it is screwed. Then, if by any jarring or from other causes the nut should have a tendency to turn so as to unscrew, the teeth $a'$ will prevent the washer from turning, and the inclined surfaces of the projection $d$ and notch $b$, acting against each other, will press the teeth still further in, and at the same time prevent the nut from becoming loose.

Having thus fully described my invention, what I claim as new, and desire to secure by Letters Patent, is—

The combination of the nut C with its notch $b$, and the washer D with its projection $d$ and teeth $a'$, all as herein shown and described, to be used with a screw-bolt, substantially as and for the purposes set forth.

In testimony that I claim the foregoing I have hereunto set my hand this 25th day of November, 1871.

HIRAM C. STOUFFER.

Witnesses:
 A. N. MARR,
 HARRY C. SCOTT,
 EDM. F. BROWN.         (14)